United States Patent
Isoda et al.

(10) Patent No.: US 7,950,491 B2
(45) Date of Patent: May 31, 2011

(54) SADDLE-RIDE TYPE FOUR-WHEELED VEHICLE

(75) Inventors: Takashi Isoda, Shizuoka (JP); Takehito Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 90 days.

(21) Appl. No.: 12/553,237

(22) Filed: Sep. 3, 2009

(65) Prior Publication Data
US 2010/0059979 A1  Mar. 11, 2010

(30) Foreign Application Priority Data
Sep. 5, 2008  (JP) ................................. 2008-229131

(51) Int. Cl.
*B62D 21/12* (2006.01)
*B62D 21/11* (2006.01)

(52) U.S. Cl. .. 180/311; 280/785; 280/788; 280/124.109
(58) Field of Classification Search .................. 180/311, 180/312; 280/124.109, 781, 785, 788, 796; 295/203.01
See application file for complete search history.

(56) References Cited

U.S. PATENT DOCUMENTS

| | | | | |
|---|---|---|---|---|
| 5,934,397 A | * | 8/1999 | Schaper | 180/65.245 |
| 5,975,624 A | * | 11/1999 | Rasidescu et al. | 296/203.01 |
| 6,702,058 B2 | * | 3/2004 | Ishii et al. | 180/311 |
| 7,306,069 B2 | * | 12/2007 | Takeshima et al. | 180/312 |
| 7,618,063 B2 | * | 11/2009 | Takeshima et al. | 280/785 |
| 7,762,587 B2 | * | 7/2010 | Maeda et al. | 280/788 |
| 2001/0027890 A1 | * | 10/2001 | Bria et al. | 180/291 |
| 2007/0007758 A1 | | 1/2007 | Maeda et al. | |

FOREIGN PATENT DOCUMENTS

JP  2007-015640 A  1/2007

* cited by examiner

*Primary Examiner* — Toan C To
*Assistant Examiner* — Joseph Rocca
(74) *Attorney, Agent, or Firm* — Keating & Bennett, LLP

(57) ABSTRACT

A saddle-ride type four-wheeled vehicle has a structure that ensures a sufficient clearance between a shock absorber and a front rod of an upper arm supporting front wheels, and also achieves satisfactory frame strength. The body frame of the saddle-ride type four-wheeled vehicle includes a lower frame extending below an engine to the rear of the vehicle. The body frame includes a front frame which is made of aluminum or aluminum alloy and located above the lower frame. In the front frame, pairs of arm-supporting portions which are spaced away from each other in a front-rear direction and support the front rods and a rear rods of the upper arms, and shock-absorber-supporting portions which are situated above the arm-supporting portions and support upper ends of the shock absorbers, are provided. The front frame has, at a forefront of the front frame, an extending portion extending obliquely upward and rearward from a lower end of the extending portion connected to the lower frame. In the extending portion, front arm-supporting portions and the shock-absorber-supporting portions are provided.

11 Claims, 11 Drawing Sheets

SADDLE-RIDE TYPE FOUR-WHEELED VEHICLE

The present application claims priority from Japanese patent application JP2008-229131 filed on Sep. 5, 2008, the entire contents of which are hereby incorporated by reference into this application.

BACKGROUND OF THE INVENTION

1. Field of the Invention

The present invention relates to a saddle-ride type four-wheeled vehicle including an all terrain vehicle, for example, and more particularly, to technology to increase strength of the body frame of the vehicle.

2. Description of the Related Art

Conventionally, there is a saddle-ride type four-wheeled vehicle that is used mainly on rough terrain (for example, one disclosed in JP 2007-15640 A). In the saddle-ride type four-wheeled vehicle, front wheels are supported so as to be movable up and down by an upper arm extending from the body frame of the vehicle outward in a vehicle width direction (upper suspension arm 25 in JP 2007-15640 A) and by a lower arm (lower suspension arm 26 in JP 2007-15640 A). The upper arm includes a front rod and a rear rod extending outward in the vehicle width direction, and supports the front wheels at a forward end side of the front rod and the rear rod. Further, an upper end of a shock absorber for reducing upward and downward movement of the front wheels is supported by the body frame. The shock absorber extends obliquely downward between the front rod and the rear rod, and is coupled to the lower arm.

In the saddle-ride type four-wheeled vehicle disclosed in JP 2007-15640 A, the body frame includes a portion (hereinafter, referred to as lower frame (front frame member 43 and lower frame member 42 in JP 2007-15640 A)) extending under the engine to the rear of the vehicle, and a portion (hereinafter, referred to as front frame) which is situated between the right and left front wheels and supports the upper arm and the shock absorber. In JP 2007-15640 A, the front frame has, at the forefront thereof, a tubular upper frame member (hereinafter, referred to as front extending portion) 41 extending upward from its lower end connected to the lower frame. Further, the front frame includes a center frame member (hereinafter, referred to as beam) 48 extending rearward from a middle position of the front extending portion. Further, a shock-absorber-supporting portion for supporting the upper end of the shock absorber is formed at an upper portion of the front extending portion. Further, a pair of arm-supporting portions for supporting the front rod and the rear rod of the upper arm are formed in the beam.

In JP 2007-15640 A, in order to prevent interference between the front rod of the upper arm and the shock absorber, that is, in order to secure a sufficient clearance between the front rod and the shock absorber, the front extending portion is bent at the middle thereof. In other words, in JP 2007-15640 A, the front extending portion extends upward from its lower end connected to the lower frame, and after that, the front extending portion is bent rearward at a bent portion. In addition, the front extending portion has an inclined portion extending from the bent portion obliquely upward and rearward. The shock-absorber-supporting portion is formed in the inclined portion. Therefore, by bending the front extending portion at the middle thereof as just described, the shock-absorber-supporting portion can be situated further rearward than a proximal end of the front rod. As a result, it becomes easy to secure the clearance between the shock absorber and the front rod.

SUMMARY OF THE INVENTION

The inventor of preferred embodiments of the present invention described and claimed in the present application conducted an extensive study and research regarding a saddle-ride type four-wheeled vehicle, such as the one described above, and in doing so, discovered and first recognized new unique challenges and previously unrecognized possibilities for improvements as described in greater detail below.

The inventor of the present invention has considered making the lower frame, which supports the engine from below, of iron, and on the other hand, making the front frame, which supports the upper arm and the upper end of the shock absorber, of aluminum or aluminum alloy in order to reduce the weight of the vehicle.

However, in JP 2007-15640 A, the front extending portion of the front frame is bent at the middle thereof. Thus, when the front frame is made of aluminum or the like, there arises a problem that it is difficult to ensure satisfactory frame strength.

In other words, when the saddle-ride type four-wheeled vehicle travels on rugged terrain, the shock absorber expands and contracts in order to reduce upward and downward movement of the front wheels. In this case, a force to push up the shock-absorber-supporting portion acts from the upper end of the shock absorber onto the shock-absorber-supporting portion formed in the inclined portion, and a moment is generated by the force at the bent portion. An elastic modulus (rigidity) of aluminum or aluminum alloy is lower than that of iron, and hence it is particularly difficult to ensure frame strength against the above-mentioned force (moment) when the front extending portion made of aluminum or the like is bent.

In order to overcome the previously unrecognized and unsolved challenges described above, a preferred embodiment of the present invention provides a saddle-ride type four-wheeled vehicle including a front frame made of aluminum or aluminum alloy, and arranged to ensure a sufficient clearance between a front rod of an upper arm and a shock absorber, and to achieve sufficient and satisfactory frame strength.

According to a preferred embodiment of the present invention, a saddle-ride type four-wheeled vehicle includes front wheels arranged on right and left sides of a body frame of the vehicle, and upper arms which extend from the body frame outward in a vehicle width direction and support the front wheels, each of the upper arms including a front rod and a rear rod which extend outward in the vehicle width direction from positions separated from each other in a front-rear direction. Further, the saddle-ride type four-wheeled vehicle includes shock absorbers. Upper ends of the shock absorbers are supported by the body frame, and middle portions of the shock absorbers are situated between the front rods and the rear rods. The body frame includes a lower frame extending below an engine from between the right and left front wheels to the rear of the vehicle. Further, the body frame includes a front frame which is made of aluminum or aluminum alloy, situated between the right and left front wheels, and located above the lower frame. Pairs of arm-supporting portions which are spaced away from each other in the front-rear direction and support the front rods and the rear rods, and shock-absorber-supporting portions which are situated above the arm-supporting portions and support the upper ends of the shock absorbers, are provided in the front frame. The front frame includes, at a forefront of the front frame, an extending portion extending obliquely upward and rearward from a lower end of the extending portion connected to the lower frame. Further, front arm-supporting portions of the arm-supporting portions and the shock-absorber-supporting portions are provided in the extending portion.

According to a preferred embodiment of the present invention, the extending portion extends obliquely upward and rearward from the lower end thereof, and hence the extending portion can have a straight, unbent shape. Therefore, in comparison with a case where the extending portion is bent at the middle thereof, it becomes easier to ensure frame strength. Further, in a preferred embodiment of the present invention, the extending portion is situated at the forefront of the front frame, and the front arm-supporting portions are provided in the extending portion. Therefore, in comparison with a case where the front arm-supporting portions are formed in the beam (center frame member 48 in JP 2007-15640 A) as in the case of JP 2007-15640 A, it becomes easier to support proximal ends of the front rods at positions separated forward from the shock absorbers, and it is possible to ensure sufficient clearances between the front rods and the shock absorbers.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
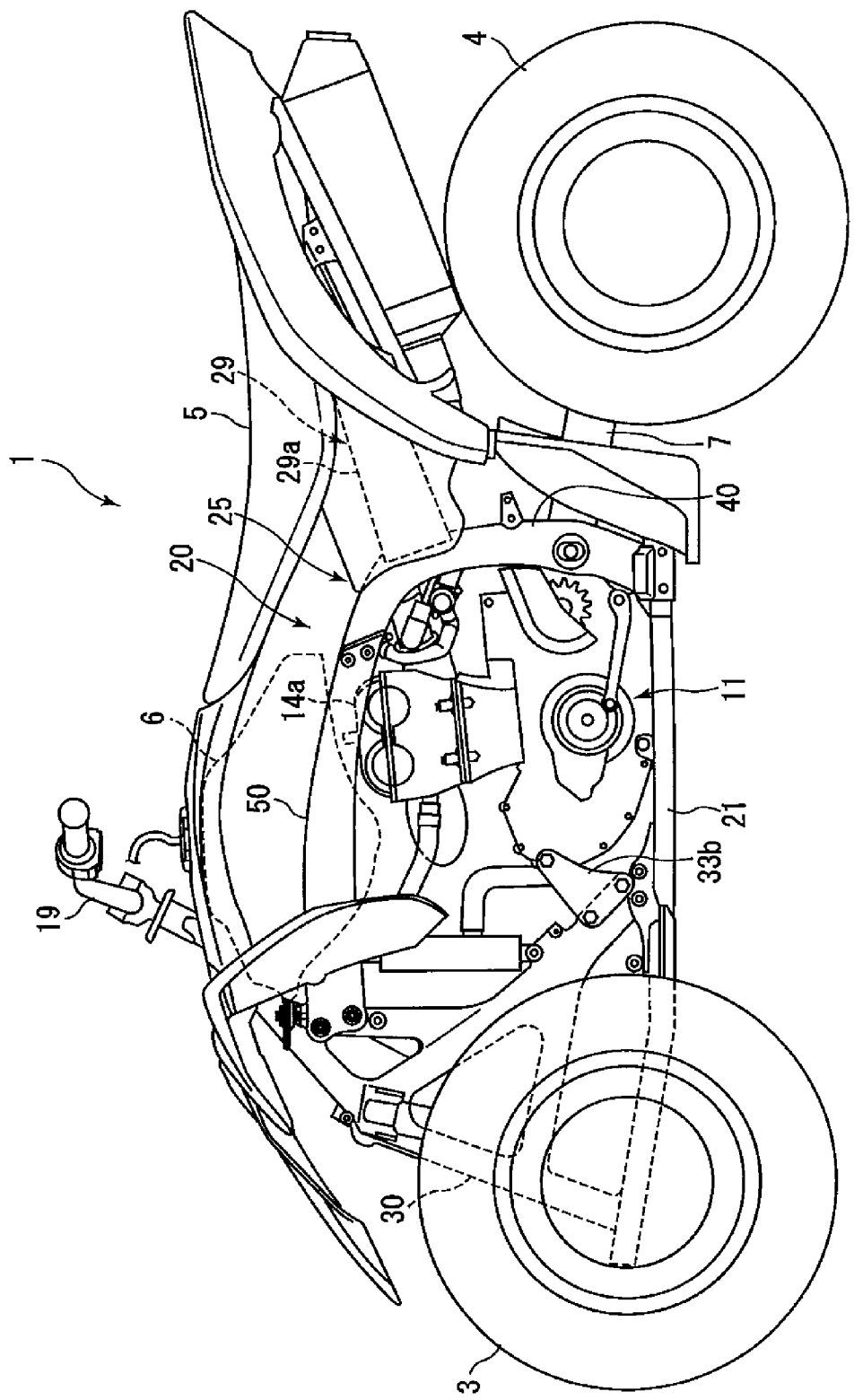
FIG. 1 is a side view of a saddle-ride type four-wheeled vehicle according to a preferred embodiment of the present invention and including a body frame.
Figure 2:
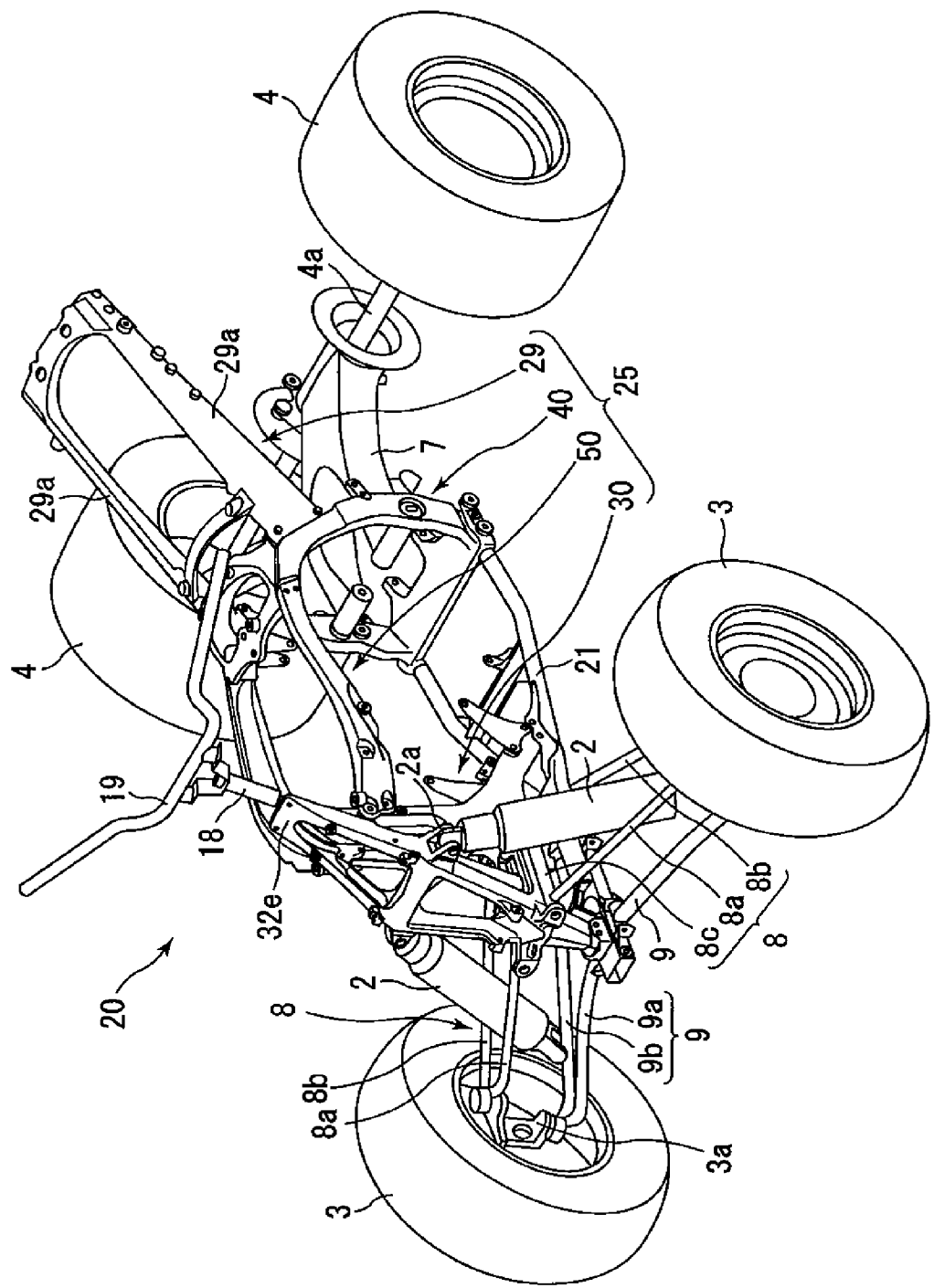
FIG. 2 is a perspective view of the body frame, front wheels, and rear wheels.
Figure 3:
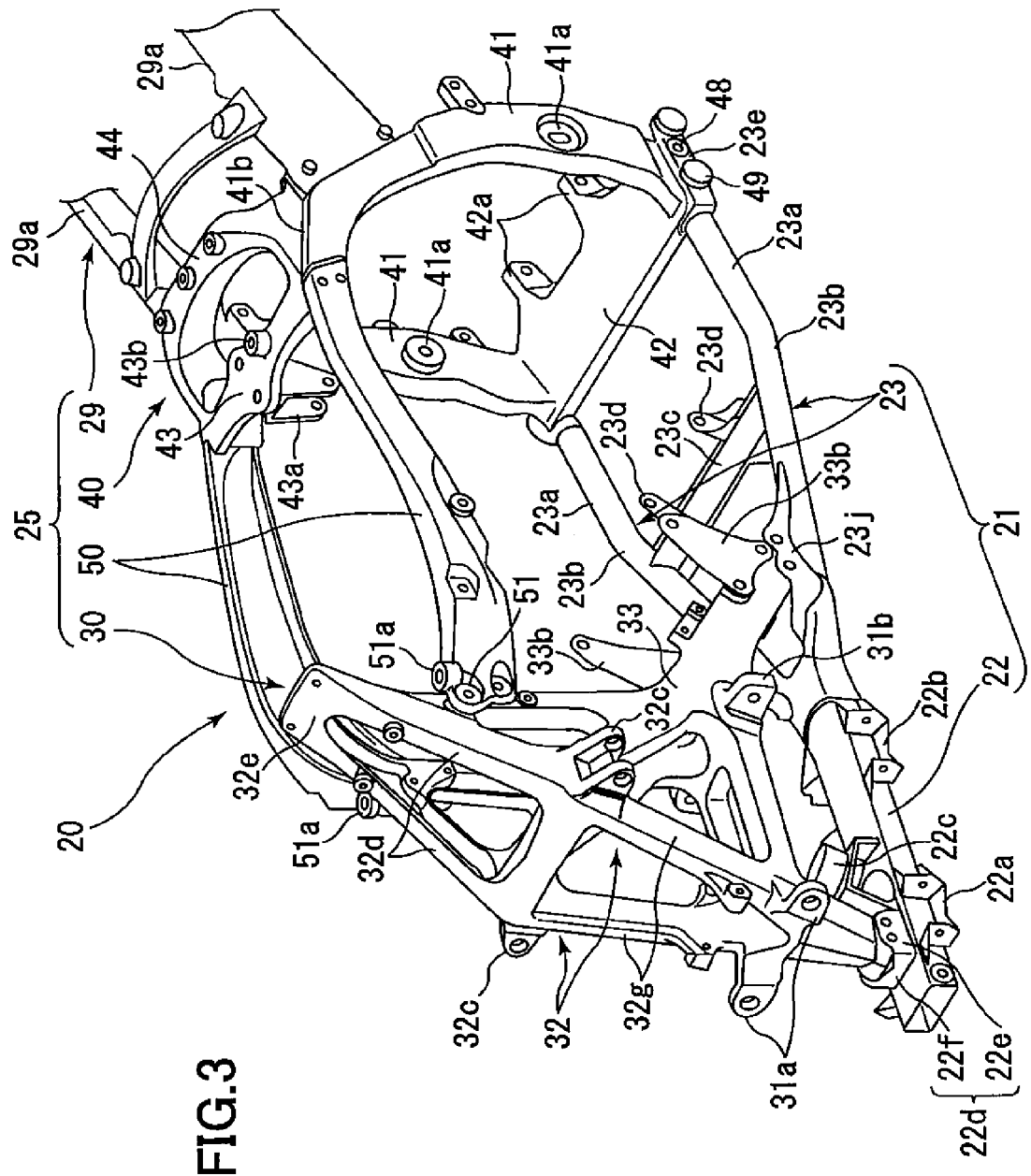
FIG. 3 is a perspective view of the body frame, which illustrates an upper frame and a lower frame of the body frame.
Figure 4:
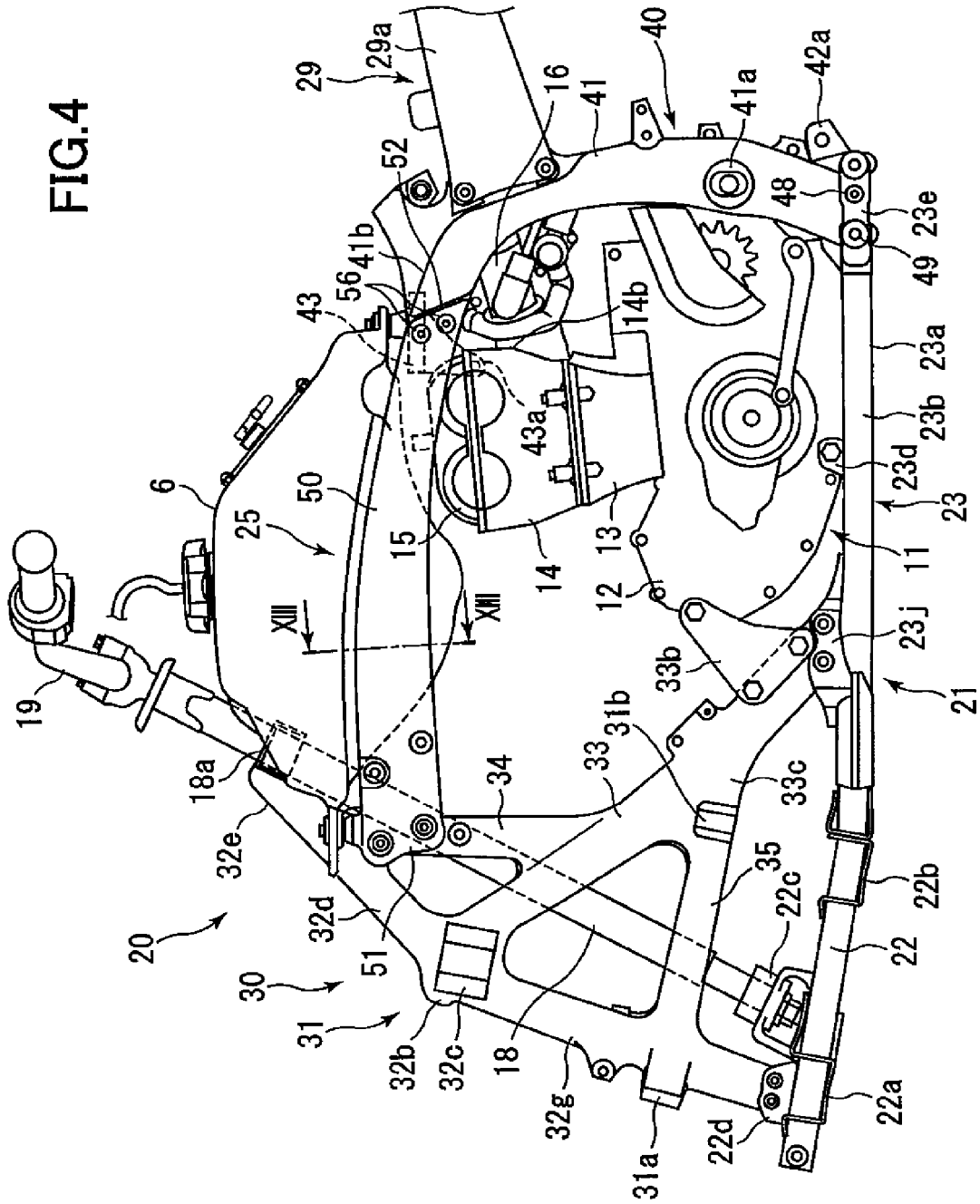
FIG. 4 is a side view of the body frame, an engine, and a fuel tank.
Figure 5:
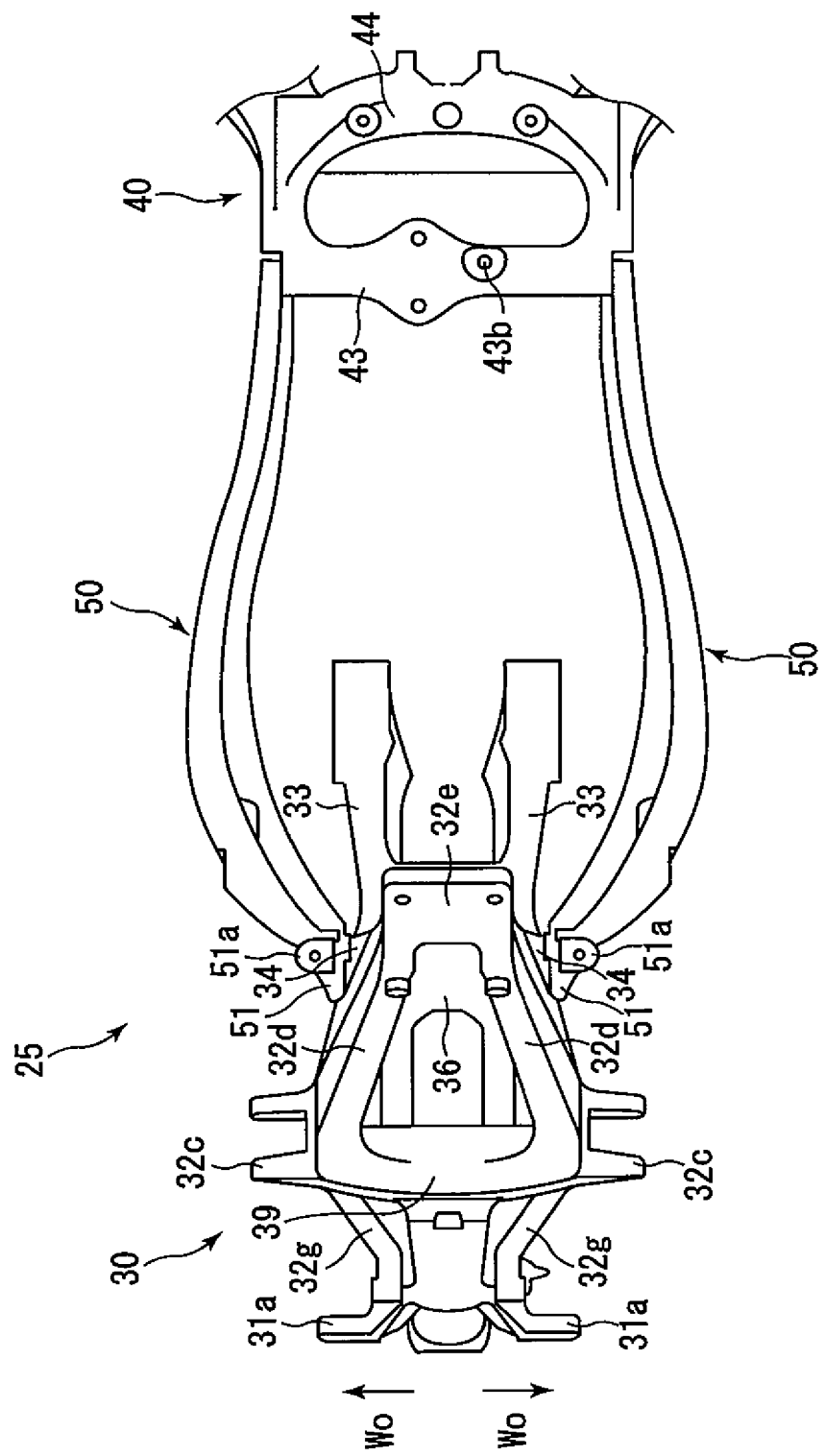
FIG. 5 is a plane view of a front portion of the body frame.
Figure 6:
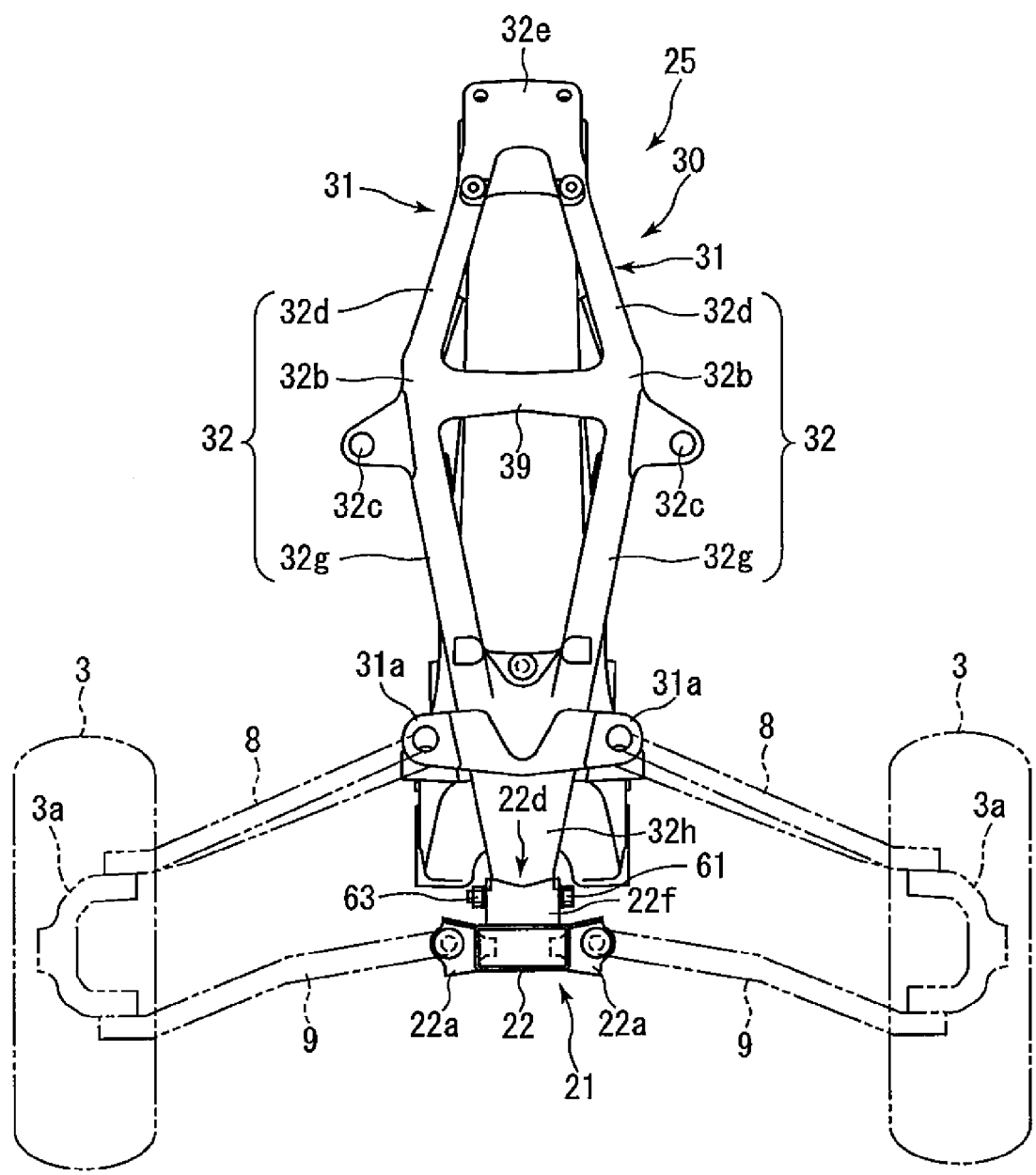
FIG. 6 is a front view of the body frame.

In the following, preferred embodiments of the present invention are described with reference to the drawings. FIG. 1 is a side view of a saddle-ride type four-wheeled vehicle 1 that is an example of a preferred embodiment of the present invention and includes a body frame 20. FIG. 2 is a perspective view of the body frame 20, front wheels 3, and rear wheels 4. FIG. 3 is a perspective view of the body frame 20. FIG. 4 is a side view of the body frame 20, an engine 11, and a fuel tank 6. FIG. 5 is a plane view of a front portion of the body frame 20. FIG. 6 is a front view of the body frame 20.

The saddle-ride type four-wheeled vehicle 1 preferably is an all terrain vehicle. As illustrated in FIG. 1 or 2, the saddle-ride type four-wheeled vehicle 1 includes the body frame 20, the right and left front wheels 3, the right and left rear wheels 4, the engine 11, and a seat 5. The front wheels 3 are located on right and left sides of the body frame 20, respectively, and the body frame 20 includes a lower frame 21 extending rearward below the engine 11 from between the right and left front wheels 3 to the rear of the vehicle 1. Further, the body frame 20 includes an upper frame 25 located above the lower frame 21. The upper frame 25 includes a front frame section (front frame in claims) 30, a rear frame section 40, upper frame sections 50, and a seat frame section 29.

As illustrated in FIG. 4, the engine 11 includes a crankcase 12 in the lower portion thereof. A cylinder block 13 is located on the crankcase 12, and a cylinder head 14 is disposed on the cylinder block 13. In addition, the cylinder head 14 is covered with a head cover 15 from above. The cylinder block 13 is arranged such that a cylinder formed inside the cylinder block 13 is inclined slightly forward with respect to a vertical direction. A throttle body 16, inside which a throttle valve opening and closing in accordance with throttle operation by a rider is provided, is located behind the cylinder block 13.

As illustrated in FIG. 1, the engine 11 is located in a central portion of a vehicle body. That is, in a front-rear direction of the vehicle body, the engine 11 is situated between the front wheels 3 and the rear wheels 4. Further, in the vehicle width direction, the engine 11 is situated in the central portion of the vehicle with respect to the right and left front wheels 3, and situated in the central portion of the vehicle 1 with respect to the right and left rear wheels 4. In this regard, the engine 11 may be arranged such that its front end is situated further forward than the rearmost portions of the front wheels 3. Similarly, the engine 11 may be arranged such that its rear end is situated further rearward than the frontmost portions of the rear wheels 4. Further, the engine 11 may be arranged such that the lateral side of the engine 11 overlaps the front wheels 3 or the rear wheels 4 when viewed from the front of the vehicle 1.

As illustrated in FIG. 1, the fuel tank 6 is located above the engine 11. The seat 5 is located posterior to the fuel tank 6. The seat 5 preferably is a saddle-ride type seat on which a rider can sit astride. The seat frame section 29 is located under the seat 5, and the seat 5 is supported by the seat frame section 29.

As illustrated in FIG. 2, a swing arm 7 is located below the seat frame section 29. The front end of the swing arm 7 is coupled to the rear frame section 40 via a pivot (not shown) supported by the rear frame section 40. The rear end of the swing arm 7 is coupled to a wheel shaft 4a of the rear wheels 4. The rear frame section 40 supports the rear wheels 4 via the swing arm 7 and the wheel shaft 4a. The swing arm 7 is capable of moving up and down around the pivot together with the rear wheels 4.

As illustrated in FIG. 2, the front wheels 3, and upper arms 8 coupled to the front wheels 3, are located on the right and left sides of the front frame section 30. Each of the upper arms 8 includes a front rod 8a and a rear rod 8b. The front rod 8a and the rear rod 8b extend outward in the vehicle width direction from positions separated from each other in the front-rear direction. That is, the proximal end of the front rod 8a and the proximal end of the rear rod 8b are separated from each other in the front-rear direction. The distal portions of the front rod 8a and the rear rod 8b are connected to each other. The distal ends of the upper arms 8 are coupled to knuckle arms 3a provided on the front wheels 3, and the upper arms 8 support the front wheels 3 so as to allow the front wheels 3 to move up and down. Further, in this example, each of the upper arms 8 includes a pivot portion 8c. The pivot portion 8c is arranged so as to extend in the front-rear direction of the vehicle 1. The proximal ends of the rods 8a, 8b are connected to the pivot portion 8c, and the rods 8a, 8b extend outward in the vehicle width direction from the pivot portion 8c. The pivot portion 8c is rotationally supported by the front frame section 30. With this configuration, each of the upper arms 8 is capable of moving with respect to the front frame section 30.

As illustrated in FIG. 2, lower arms 9 are located under the right and left upper arms 8. Similarly to the upper arms 8, the lower arms 9 are arranged to extend outward in the vehicle width direction. The distal ends of the lower arms 9 are also coupled to the knuckle arms 3a of the front wheels 3, and the lower arms 9 support, together with the upper arms 8, the front wheels 3 so as to allow the front wheels 3 to move up and down. The proximal ends of the lower arms 9 are supported by the lower frame 21. In this regard, similarly to the upper arms 8, each of the lower arms 9 includes a front rod 9a and a rear rod 9b, and the front rod 9a and the rear rod 9b extend outward in the vehicle width direction from the positions separated from each other in the front-rear direction.

The saddle-ride type four-wheeled vehicle 1 includes shock absorbers 2. An upper end 2a of each of the shock absorbers 2 is supported by the front frame section 30. Each of the shock absorbers 2 extends obliquely downward from the upper end 2a through between the front rod 8a and the rear rod 8b of the upper arm 8. That is, the middle portion of each of the shock absorbers 2 is situated between the front rod 8a and the rear rod 8b. The lower end of each of the shock absorbers 2 is connected with the lower arm 9. Each of the shock absorbers 2 reduces upward and downward movement of the front wheels 3 by expanding and contracting in a length direction thereof.

A steering stem 18 extending obliquely upward and downward is located at the front portion of the vehicle 1. A handlebar 19 is fixed on the upper end of the steering stem 18. The steering stem 18 is coupled to the front wheels 3 via a tie rod (not shown), and the front wheels 3 can be steered by operation of the handlebar 19.

As illustrated in FIG. 3, the lower frame 21 preferably has a substantially Y-shape. The lower frame 21 is situated below the engine 11 and extends in the front-rear direction. The front frame section 30, the rear frame section 40, the upper frame sections 50, and the seat frame section 29 which are included in the upper frame 25 are situated above the lower frame 21. The lower frame 21 preferably is made of a material different from that of the upper frame 25. In this example, the lower frame 21 preferably is made of a material having an elastic modulus higher than that of the upper frame 25, that is, a material having rigidity higher than that of the upper frame 25. Further, the upper frame 25 preferably is made of a material having specific gravity lower than that of the lower frame 21. For example, the lower frame 21 is preferably made of iron or steel. The upper frame 25 is preferably made of aluminum or aluminum alloy. In the example described herein, the front frame section 30, the rear frame section 40, the upper frame sections 50, and the seat frame section 29 which are included in the upper frame 25 are all preferably made of the same material such as aluminum.

As illustrated in FIG. 3, the lower frame 21 includes, in the front portion of the lower frame 21, an arm-coupling section 22 which is situated at the center in the vehicle width direction and extends in the front-rear direction. Further, the lower frame 21 includes right and left engine-supporting sections 23 which are situated under the engine 11 and support the engine 11 from below.

The arm-coupling section 22 preferably is a pipe-shaped member. That is, the arm-coupling section 22 preferably is a tubular member having a substantially rectangular shape in cross-section. The lower arms 9 are supported by the arm-coupling section 22. Specifically, brackets 22a, 22b, which are spaced away from each other in the front-rear direction, are disposed on each of right and left side surfaces of the arm-coupling section 22. The proximal end of the front rod 9a is coupled to the front bracket 22a, and the proximal end of the rear rod 9b is coupled to the rear bracket 22b. Further, a stem-supporting portion 22c arranged to support the lower end of the steering stem 18 is provided on the upper surface of the arm-coupling section 22 (see FIGS. 3 and 4).

As illustrated in FIG. 3, the right and left engine-supporting sections 23 extend rearward from the arm-coupling section 22, and are situated under the crankcase 12. The engine-supporting sections 23 include rearward extending portions 23a as pipe-like members, respectively. The rearward extending portions 23a extend from the arm-coupling section 22 obliquely rearward and outward in the vehicle width direction, and a distance between the right and left rearward extending portions 23a is increased toward the rear of the vehicle. Further, the rearward extending portions 23a have bent portions 23b at middle portions of the rearward extending portions 23a, respectively. In a portion situated further rearward than the bent portion 23b, each of the rearward extending portions 23a extends rearward in the front-rear direction of the vehicle 1. A cross portion 23c bridges between the right and left rearward extending portions 23a. The cross portion 23c is situated under the crankcase 12. Right and left engine brackets 23d protruding obliquely upward toward the lower surface of the crankcase 12 are provided on the cross portion 23c. The engine brackets 23d are fixed to the lower portion of the engine 11, and the engine-supporting sections 23 support the engine 11 from below (see FIG. 4). In this regard, all of the rearward extending portions 23a, the cross portion 23c, and the engine brackets 23d are preferably made of a material having an elastic modulus higher than that of the upper frame 25.

As described above, the upper frame 25 includes the front frame section 30, the rear frame section 40, the upper frame sections 50, and the seat frame section 29. Those members are separate members, and are coupled to each other by fasteners, such as bolts, for example.

Figure 7:
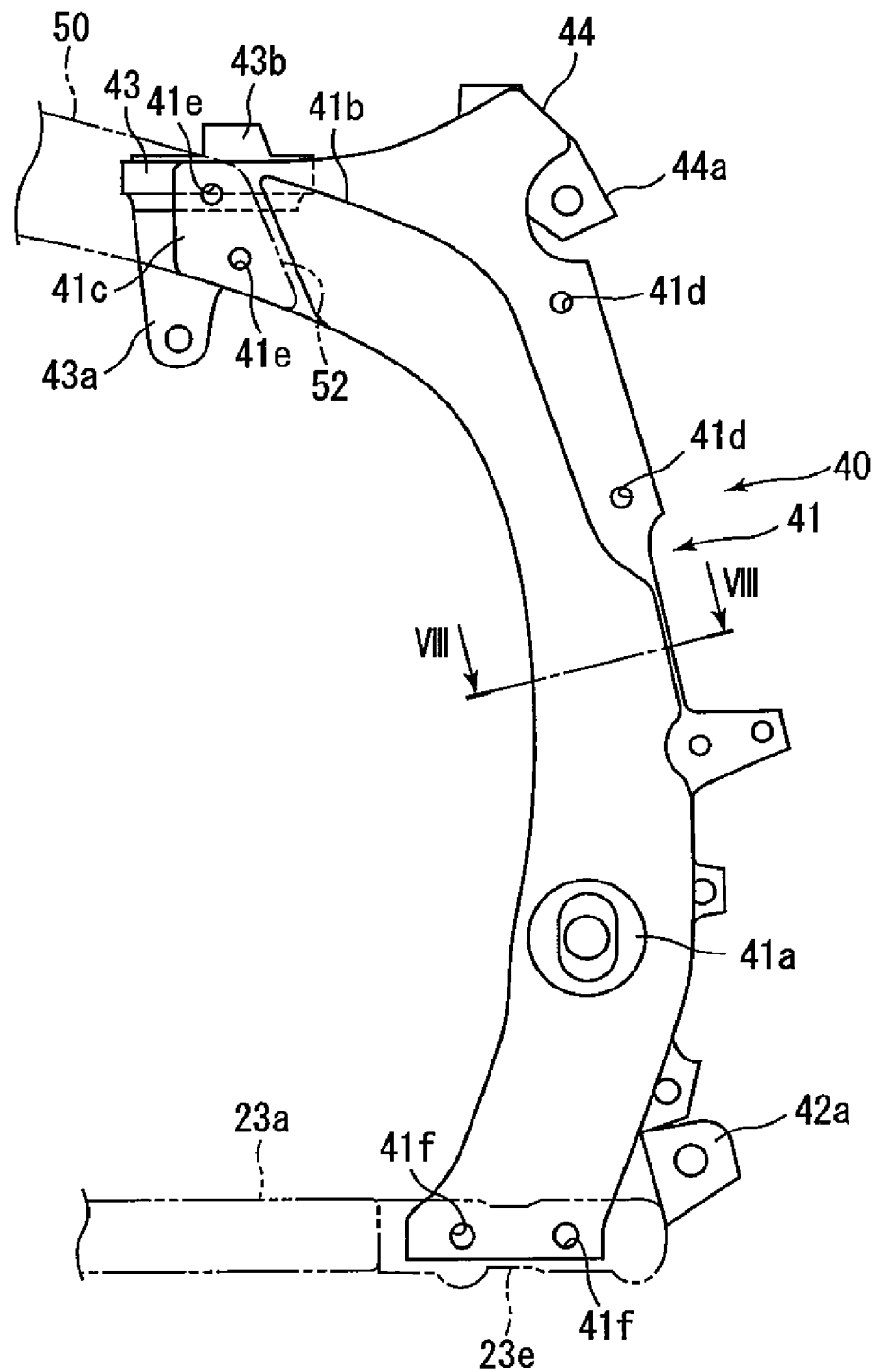
FIG. 7 is a side view of a rear frame of the body frame.
Figure 8:
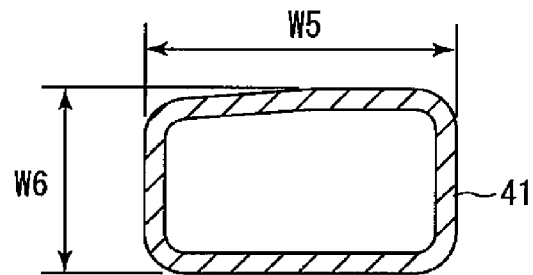
FIG. 8 is a sectional view taken along the line VIII-VIII of FIG. 7.

The rear frame section 40 is described hereinafter. FIG. 7 is a side view of the rear frame section 40, and FIG. 8 is a sectional view taken along the line VIII-VIII of FIG. 7.

The rear frame section 40 is situated posterior to the engine 11, and extends in an up-and-down direction. As illustrated in FIG. 3 or 4, the rear frame section 40 includes a pair of right and left longitudinal frame portions 41, 41. Further, the rear frame section 40 includes a lower crossbar 42, an upper crossbar 43, and a rear crossbar 44 which bridge between the right and left longitudinal frame portions 41.

The rear end of the lower frame 21 is connected to the lower end of each of the longitudinal frame portions 41. Specifically, as illustrated in FIG. 7, a fixing portion 23e is provided at the rear end of each of the rearward extending portions 23a of the lower frame 21. The fixing portion 23e is located on an outer side in the vehicle width direction of each of the longitudinal frame portions 41, and is fixed by bolts 48, 49, for example, at the lower end of each of the longitudinal frame portions 41 (see FIG. 4). In this regard, FIG. 7 illustrates a plurality of (two, in this example) fixing holes 41f formed in the lower end of each of the longitudinal frame portions 41. The bolts 48, 49 are fitted into the fixing holes 41f.

As illustrated in FIG. 3, 4, or 7, the longitudinal frame portions 41 extend upward from the lower ends thereof. The upper portions of the longitudinal frame portions 41 are curved forward, and the longitudinal frame portions 41 respectively have, at the upper portions thereof, upper inclined portions 41b extending obliquely forward. The upper crossbar 43 bridges between front ends (upper ends) 41c of the right and left upper inclined portions 41b, and is situated above the engine 11. An engine bracket 43a having a substantially U-shape opening downward is fixed on the lower surface of the upper crossbar 43. The engine bracket 43a is suspended from the upper crossbar 43, and its lower end is fixed to the upper portion of the engine 11.

Specifically, as illustrated in FIG. 4, the upper crossbar 43 is situated above a rear surface 14b of the cylinder head 14, and the lower end of the engine bracket 43a is fixed to the cylinder head 14. Thus, the rear frame section 40 suspends the engine 11 from above. In this regard, as illustrated in FIG. 3, a tank-supporting portion 43b, to which the rear end of the fuel tank 6 is fixed, is provided on the upper surface of the upper crossbar 43. Further, as described later, the rear ends of the upper frame sections 50 are fixed to the front ends 41c of the upper inclined portions 41b (see FIGS. 3 and 7).

As illustrated in FIG. 7, fixing holes 41d, to which the seat frame section 29 is fixed, are formed in the upper portion of each of the longitudinal frame portions 41. The seat frame section 29 includes a pair of right and left extending portions 29a, 29a extending rearward (see FIG. 3), and the front end of each of the extending portions 29a is fixed to the fixing holes 41d. At a position slightly above the lower end of each of the longitudinal frame portions 41, a supporting portion 41a arranged to support a pivot coupled to the front end of the swing arm 7 is provided.

As illustrated in FIG. 3 or 7, the rear crossbar 44, which is situated posterior to the upper crossbar 43, bridges between the right and left longitudinal frame portions 41, and supports the front portion of the seat 5. Further, supporting portions 44a arranged to support an upper end of a rear suspension (not shown) are provided in the rear crossbar 44. The lower crossbar 42 bridges between the lower ends of the right and left longitudinal frame portions 41. Supporting portions 42a arranged to support a lower end of the rear suspension via a link member (not shown) are provided in the lower crossbar 42.

The rear frame section 40 including the longitudinal frame portions 41 and three crossbars 42, 43, and 44 preferably are formed integrally by, for example, casting and forging. Further, as illustrated in FIG. 8, the longitudinal frame portions 41 are tubular, and preferably have a substantially rectangular cross-section (cross-section taken along a plane perpendicular or substantially perpendicular to an extending direction of the longitudinal frame portions 41). Further, the cross-section of the longitudinal frame portions 41 has a rectangular shape elongated in the front-rear direction. That is, a width W5 in the front-rear direction of the cross-section of the longitudinal frame portions 41 is larger than a width W6 in the vehicle width direction thereof.

The front frame section 30 is described hereinafter. As illustrated in FIG. 2 or 4, the front frame section 30 is situated between the right and left front wheels 3, and is located on the lower frame 21. Further, two pairs of arm-supporting portions 31a, 31b are provided on the front frame section 30, the arm-supporting portions 31a, 31b being spaced away from each other in the front-rear direction and supporting the front rod 8a and the rear rod 8b of each of the upper arms 8. The front frame section 30 supports, via the upper arms 8, the front wheels 3, 3 situated on the right and left sides of the front frame section 30. Further, shock-absorber-supporting portions 32c, each of which is situated above the arm-supporting portions 31a, 31b and supports the upper end 2a of the shock absorber 2 on the front frame section 30, are provided on the front frame section 30.

Figure 9:
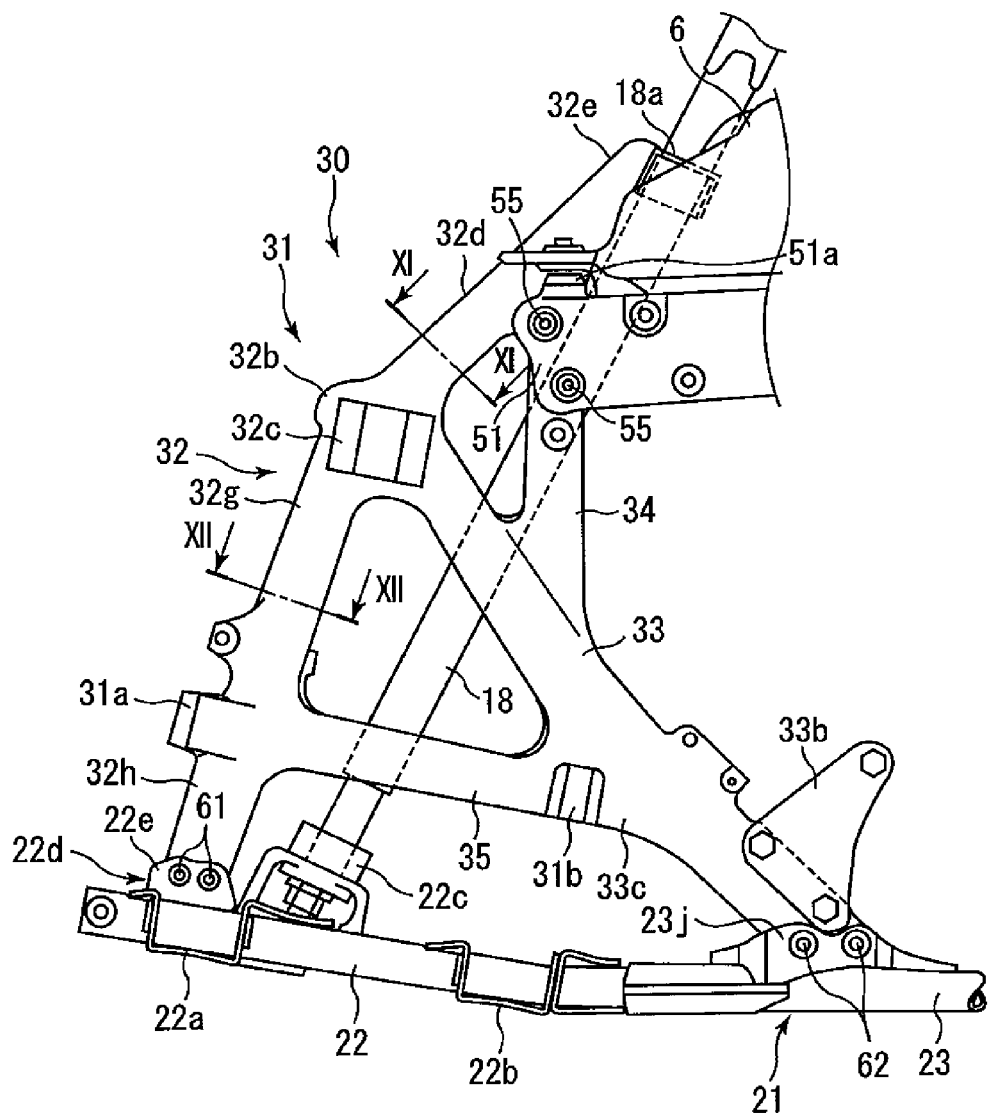
FIG. 9 is an enlarged view illustrating a portion illustrated in FIG. 4 in which a front frame is provided.
Figure 10:
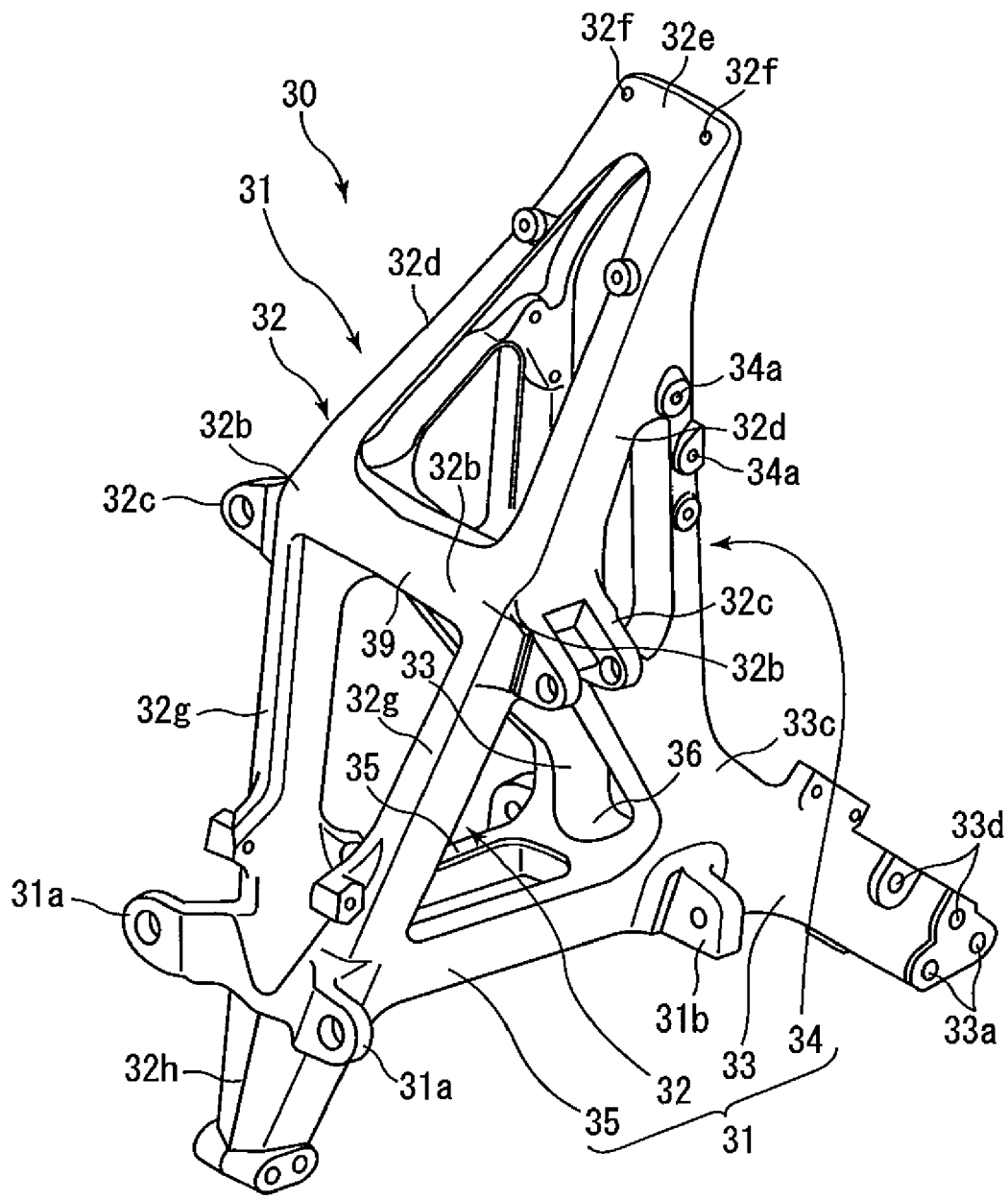
FIG. 10 is a perspective view of the front frame.
Figure 11:
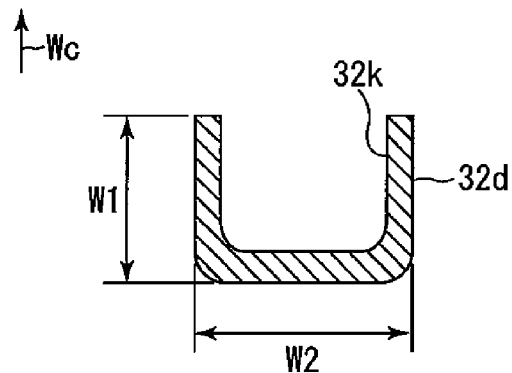
FIG. 11 is a sectional view taken along the line XI-XI of FIG. 9.
Figure 12:
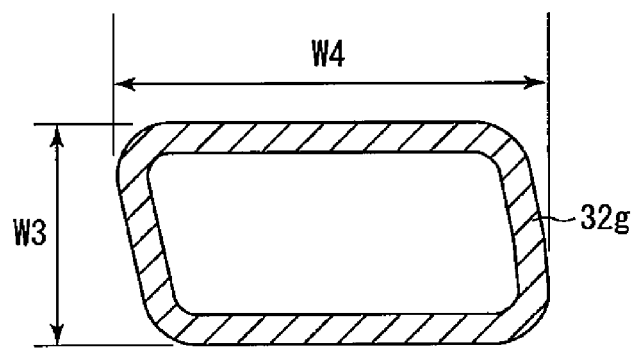
FIG. 12 is a sectional view taken along the line XII-XII of FIG. 9.

FIG. 9 is an enlarged view of the front frame section 30 illustrated in FIG. 4. FIG. 10 is a perspective view of the front frame section 30. FIG. 11 is a sectional view taken along the line XI-XI of FIG. 9, and FIG. 12 is a sectional view taken along the line XII-XII of FIG. 9.

As illustrated in FIG. 9 or 10, the front frame section 30 includes right and left side frame portions 31. Each of the right and left side frame portions 31 includes a front pillar 32, a rear pillar (rear extending portion in claims) 33, a reinforcing pillar 34, and a beam 35.

The front pillars 32 are situated at the forefronts of the side frame portions 31, and extend obliquely in the up-and-down direction. That is, the front pillars 32 extend upward from the lower ends of the front pillars 32, and are inclined rearward. Middle portions 32b of the right and left front pillars 32 are spaced away from each other in the vehicle width direction, and a cross portion 39 bridges between the right and left middle portions 32b (see FIG. 10).

As illustrated in FIG. 6, 9, or 10, each of the front pillars 32 includes, at the upper portion thereof, an upper pillar (upper extending portion in claims 32d extending straightly from the middle portion 32b, obliquely upward and rearward. The right and left upper pillars 32d are inclined toward the center in the vehicle width direction, and a distance between the right and left upper pillars 32d is decreased toward the upper ends of the upper pillars 32d. Further, the upper ends of the upper pillars 32d are coupled and integrated with each other. The integrated upper ends of the upper pillars 32d are disposed in a steering-supporting portion 32e to support the steering stem 18. A holder 18a arranged to rotatably hold the steering stem 18 is fixed to the steering-supporting portion 32e (see FIG. 4), and the front pillars 32 support the steering stem 18 at the upper ends thereof. In this regard, fixing holes 32f, to which the holder 18a is fixed, are formed in the steering-supporting portion 32e (see FIG. 10).

As illustrated in FIG. 10, each of the front pillars 32 includes, at the lower portion thereof, a lower pillar (extending portion in claims 32g. Each of the shock-absorber-supporting portions 32c arranged to support the upper end 2a of the shock absorber 2 is provided on the upper end (middle portion 32b) of the lower pillar 32g. Each of the shock-absorber-supporting portions 32c is arranged to protrude outward in the vehicle width direction from the side surface of the lower pillar 32g. The lower pillar 32g extends from its lower end (lower end of base portion 32h) connected to the lower frame 21 up to the middle portion 32b obliquely upward and rearward. In this example, the lower pillar 32g preferably has a substantially straight shape (see FIG. 9). That is, the lower pillar 32g extends straightly from the lower end of the lower pillar 32g up to the shock-absorber-supporting portion 32c. Note that, "the substantially straight shape" herein means that a material of the lower pillar 32g exists on a straight line connecting the lower end and the upper end of the lower pillar 32g together, and hence the lower pillar 32g may be slightly curved. In this regard, each of the front pillars 32 is bent rearward at the upper end of the lower pillar 32g, that is, at the middle portion 32b. Also, the upper pillar 32d extends from the middle portion 32b further obliquely upward and rearward.

As illustrated in FIG. 10, the right and left lower pillars 32g extend obliquely downward from the middle portions 32b, and are inclined toward the center in the vehicle width direction. Thus, a distance between the right and left lower pillars 32g is decreased toward the lower end of the lower pillars 32g. Further, the lower portions of the lower pillars 32g, 32g are integrated with each other, and the integrated lower portions are fixed onto the arm-coupling section 22 of the lower frame 21. That is, the lower portions of the lower pillars 32g, 32g are united with each other, and the united lower portions are disposed in the columnar base portion 32h. As illustrated in FIG. 9, the lower end of the base portion 32h is connected to the arm-coupling section 22.

In this example, the base portion 32h is fixed by a plurality of bolts 61, for example, onto a bracket 22d provided on the upper surface of the arm-coupling section 22. Specifically, as illustrated in FIG. 3, the bracket 22d preferably has a wall shaped configuration arranged to surround the outer surface of the base portion 32h. The bracket 22d includes a front wall portion 22f facing the front surface of the base portion 32h. Further, the bracket 22d has right and left side wall portions 22e having holes which are formed therein, and through which the bolts 61 are inserted. As illustrated in FIG. 6 or 9, the base portion 32h is located between the right and left side wall portions 22e. Also, the bolts 61 are inserted through the holes formed in one of the side wall portions 22e and the holes passing through the base portion 32h in a lateral direction. Further, nuts 63 are fastened to the tip end of the bolts 61 protruding from the holes formed in the other of the side wall portions 22e. Note that the bracket 22d is also preferably made of iron or steel which has rigidity higher than that of aluminum or aluminum alloy and has a thermal expansivity lower than that of aluminum or the like. Therefore, even when a thickness of the base portion 32h is changed due to thermal expansion of the front frame section 30, load is not applied directly to the bolts 61 and the nuts 63.

As described above, in addition to the right and left front pillars 32, the front frame section 30 includes the right and left rear pillars 33. As illustrated in FIG. 9 or 10, the upper ends of the rear pillars 33 are connected to the front pillars 32, and connecting positions therebetween are situated lower than the position of the steering-supporting portion 32e. In the example described herein, the upper ends of the rear pillars 33 are connected to the middle portions 32b situated at the upper ends of the lower pillars 32g. The rear pillars 33 extend from the middle portions 32b rearward and obliquely downward, and are situated under the upper pillars 32d and the steering-supporting portion 32e.

As illustrated in FIG. 9, a plate-shaped bracket 23j is provided on the rearward extending portion 23a of each of the engine-supporting sections 23 of the lower frame 21. The bracket 23j is arranged so as to protrude upward, and is situated outward from the lower end of the rear pillar 33 in the vehicle width direction. The lower end (rear end) of the rear pillar 33 is fixed to the bracket 23j by a plurality of bolts 62, for example, to thereby connect with each of the engine-supporting sections 23. In this regard, FIG. 10 illustrates fixing holes 33a formed in the lower end of the rear pillar 33. The bolts 62 for fixing the lower end of the rear pillar 33 to the bracket 23j are fitted into the fixing holes 33a. As just described, members in the body frame 20 which are made of materials having different elastic moduli are fastened to each other by fastening members such as bolts, for example. In this example, the lower frame 21 is preferably made of a material having an elastic modulus higher than that of the front frame section 30 and the rear frame section 40. Therefore, the front frame section 30 is fastened to the lower frame 21 by the bolts 61, 62, for example, and the rear frame section 40 is fastened to the lower frame 21 by the bolts 48, 49, for example.

The right and left rear pillars 33 are arranged so as to be slightly deformable outward in the vehicle width direction or toward the center in the vehicle width direction. Specifically, as illustrated in FIG. 5 or 10, one cross portion 36 bridges between the right and left rear pillars 33. The cross portion 36 is situated higher than the lower ends (that is, portions in which the fixing holes 33a are provided) of the right and left rear pillars 33. In this example, the cross portion 36 bridges between middle portions 33c of the right and left rear pillars 33. However, such a cross portion is not provided at a position lower than the middle portions 33c. Further, as described above, the front frame section 30 is preferably made of aluminum or aluminum alloy having a low elastic modulus. Therefore, the right and left rear pillars 33 can be deformed so that positions of the lower ends of the rear pillars 33 are moved slightly in the vehicle width direction. At the manufacturing stage of the body frame 20, the positions of the lower ends of the rear pillars 33 are, in some cases, shifted from positions of the brackets 23j of the lower frame 21 due to manufacturing tolerance of the front frame section 30 or the lower frame 21. Even in those cases, by deforming the rear pillars 33, it is possible to fit the positions of the lower ends of the rear pillars 33 to the positions of the brackets 23j, and to fix the rear pillars 33 to the brackets 23j.

As illustrated in FIG. 4 or 9, an engine bracket 33b extending obliquely upward toward the engine 11 is provided on the lower portion of each of the rear pillars 33. The engine bracket 33b is a plate-shaped member having a substantially triangular shape, and is fixed onto the side surface of each of the rear pillars 33. The engine bracket 33b is situated in front of the crankcase 12, and its distal end is fixed onto the front portion of the crankcase 12. In this regard, FIG. 10 illustrates fixing holes 33d formed in the lower portion of each of the rear pillars 33. Bolts for fixing the engine bracket 33b onto the lower portion of each of the rear pillars 33 are fitted into the fixing holes 33d.

As illustrated in FIG. 9 or 10, the rear pillars 33 extend rearward and obliquely downward from the middle portions 32b, and are situated under the upper pillars 32d. As described above, the front frame section 30 includes the right and left reinforcing pillars 34. The reinforcing pillars 34 bridge between the rear pillars 33 and the upper pillars 32d. In this example, connecting positions between the reinforcing pillars 34 and the upper pillars 32d are situated slightly lower than the steering-supporting portion 32e. The reinforcing pillars 34 extend from the connecting positions with the upper pillars 32d substantially in the vertical direction, and the lower ends of the reinforcing pillars 34 are connected to the rear pillars 33.

Further, as described above, the front frame section 30 includes the beams 35. The beams 35 are situated at the lower portions of the side frame portions 31. Each of the beams 35 is arranged to extend in the front-rear direction, and bridges between the lower portion of the lower pillar 32g and the middle portion 33c of the rear pillar 33. As illustrated in FIG. 9 or 10, the rear arm-supporting portion 31b, which is one of the pair of arm-supporting portions 31a, 31b arranged to support each of the upper arms 8, is disposed on the side surface of the rear portion of each of the beams 35. The arm-supporting portion 31b is arranged to protrude outward in the vehicle width direction from the side surface of each of the beams 35.

The front arm-supporting portion 31a is arranged on the lower pillar 32g. In this example, as illustrated in FIG. 9, when viewed from the side of the vehicle 1, the arm-supporting portion 31a is situated further forward than the lower pillar 32g. Specifically, the arm-supporting portion 31a is situated further forward than the front surface of the lower pillar 32g. As illustrated in FIG. 6, when viewed from the front of the vehicle 1, similarly to the arm-supporting portion 31b, the arm-supporting portion 31a is arranged to protrude outward in the vehicle width direction. Further, as illustrated in FIG. 10, the arm-supporting portion 31a and the arm-supporting portion 31b face each other in the front-rear direction, and the pivot portion 8c of each of the upper arms 8 is located between the arm-supporting portions 31a, 31b (see FIG. 2). That is, the pivot portion 8c is located along each of the beams 35, and is sandwiched by the arm-supporting portions 31a, 31b. The front end of the pivot portion 8c is supported by the arm-supporting portion 31a, and the rear end of the pivot portion 8c is supported by the arm-supporting portion 31b. In this regard, a hole passing through each of the arm-supporting portions 31a, 31b in the front-rear direction is formed in the arm-supporting portions 31a, 31b. One end of the pivot portion 8c is fitted into the hole formed in the arm-supporting portion 31a or the arm-supporting portion 31b. The other end of the pivot portion 8c is supported via a fastener, such as a bolt, for example, which is inserted through the hole formed in the arm-supporting portion 31a or the arm-supporting portion 31b. The arm-supporting portions 31a, 31b are preferably integral with the front frame section 30.

Similarly to the front pillars 32, the right and left rear pillars 33 are inclined toward the center in the vehicle width direction so as to decrease a distance between the rear pillars 33. Specifically, between the middle portions 33c and the connecting positions of the front pillars 32 and the rear pillars 33, the right and left rear pillars 33 are inclined so as to decrease the distance therebetween as the rear pillars 33 extend downward. Therefore, a distance between the right and left rear arm-supporting portions 31b can be decreased. With this configuration, in comparison with a case where the lower portions of the side frame portions 31 are largely separated from each other in the lateral direction, it is possible to adopt the upper arms 8 that are elongated in the vehicle width direction while maintaining the positions of the front wheels 3 in the vehicle width direction. As a result, while maintaining a movable range in the up-and-down direction of the front wheels 3, it is possible to reduce an operating amount (operating angle) of the upper arm 8 that is movable up and down around its proximal portion supported by the front frame section 30.

In the portions situated at an upper portion of the front frame section 30, grooves elongated in the extending directions of the portions are formed. In the example described herein, as illustrated in FIG. 11, a groove 32k is formed in each of the upper pillars 32d situated in the upper portion of the front frame section 30. That is, a cross sectional shape of the upper pillars 32d (cross sectional shape taken along a plane perpendicular or substantially perpendicular to the extending direction of the upper pillars 32d) has an open cross-section opening toward the center in the vehicle width direction. Similarly, a cross-section of the reinforcing pillars 34 situated at the upper portion of the front frame section 30 also has an open cross-section opening toward the center in the vehicle width direction.

The cross sectional shape of the lower pillars 32g (cross sectional shape of the lower pillars 32g taken along a plane perpendicular or substantially perpendicular to the extending direction of the lower pillars 32g) is preferably different from the sectional shape of the upper pillars 32d so that the lower pillars 32g have higher rigidity than that of the upper pillars 32d. In this example, as illustrated in FIG. 12, the cross sectional shape of the lower pillars 32g preferably has a rectangular closed cross-section, and the rigidity of the lower pillars 32g is higher than the rigidity of the upper pillars 32d. Similarly, the rear pillars 33 situated in the lower portion of the front frame section 30 also preferably have a rectangular closed cross-section. Since the front frame section 30 is constructed to have rigidity varying between its lower portion and its upper portion as just described, it is possible to prevent frame rigidity from varying drastically in connecting portions (that is, lower ends of the front pillars 32) between the front frame section 30 and the lower frame 21 that are made of different materials.

The upper pillars 32d and the lower pillars 32g preferably have widths in the vehicle width direction (indicated by arrows W1, W3 of FIGS. 11 and 12, respectively) that are smaller than widths in the front-rear direction (indicated by arrows W2, W4 of FIGS. 11 and 12, respectively). Further, similarly to the upper pillars 32d and the like, the rear pillars 33 and the reinforcing pillars 34 preferably have widths in the vehicle width direction that are smaller than widths in the front-rear direction. The front frame section 30 like this, which includes the above-mentioned front pillars 32, the rear pillars 33, the reinforcing pillars 34, the beams 35, and the cross portion 39, are preferably formed integrally by, for example, casting and forging.

Figure 13:
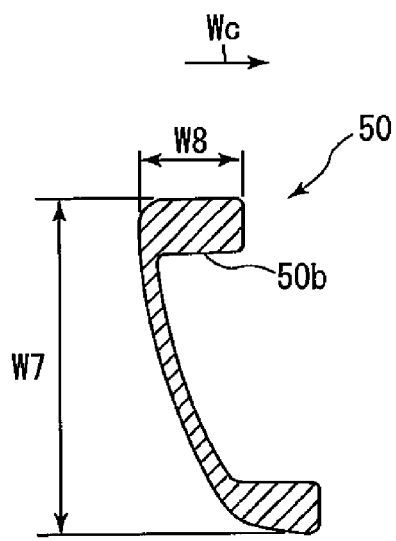
FIG. 13 is a sectional view taken along the line XIII-XIII of FIG. 4.

The upper frame sections 50 are described hereinafter. FIG. 13 is a sectional view taken along the line XIII-XIII of FIG. 4. As illustrated in FIG. 4, the upper frame sections 50 are located over the engine 11 to extend in the front-rear direction. The front ends and the rear ends of the upper frame sections 50 are fixed by a plurality of fasteners (bolts, in this example) to the front frame section 30 and the rear frame section 40 (see FIG. 4 or 9).

Specifically, as illustrated in FIG. 5 or 9, each of the upper frame sections 50 includes a front fixation portion 51 at the front end thereof. The front fixation portion 51 is situated outward (in a direction indicated by an arrow Wo of FIG. 5) from the reinforcing pillar 34 in the vehicle width direction. A plurality (for example, two, in this case) of bolts 55 are fitted to the front fixation portion 51 and the reinforcing pillar 34 from the outside in the vehicle width direction, and the front fixation portion 51 is fixed onto the side surface of the reinforcing pillar 34. Further, each of the upper frame sections 50 can be removed from the front frame section 30 by unfastening the bolts 55. In this regard, FIG. 10 illustrates fixing holes 34a formed in the reinforcing pillar 34. The bolts 55 are fitted into the fixing holes 34a.

As described above, the reinforcing pillars 34 extend in the vertical direction below the steering-supporting portion 32e. Therefore, the front fixation portions 51 are situated below the steering-supporting portion 32e. With this configuration, the frame rigidity against a force in the front-rear direction that acts on the front frame section 30 from the steering stem 18 during traveling of the vehicle 1 can be enhanced by the upper frame sections 50.

As illustrated in FIG. 4 or 7, each of the upper frame sections 50 extends rearward from the front fixation portion 51, and the rear end thereof is situated further rearward than the cylinder head 14. Each of the upper frame sections 50 has a rear fixation portion 52 at the rear end thereof. The rear fixation portion 52 is situated outward in the vehicle width direction from the front end 41c of the upper inclined portion 41b provided at each of the longitudinal frame portions 41. A plurality (for example, two, in this case) of bolts 56 are fitted to the rear fixation portion 52 and the upper inclined portion 41b from the outside in the vehicle width direction, and the rear fixation portion 52 is fixed onto the side surface of the upper inclined portion 41b. Further, each of the upper frame sections 50 can be removed from the rear frame section 40 by unfastening the bolts 56. In this regard, FIG. 7 illustrates fixing holes 41e formed in the front end 41c of the upper inclined portion 41b. The bolts 56 are fitted into the fixing holes 41e.

As illustrated in FIG. 5, the front portions of the upper frame sections 50 are curved so as to swell outward in the vehicle width direction. In this regard, the fuel tank 6 is located between the right and left upper frame sections 50 (see FIG. 4). A tank-supporting portion 51a, to which the front end of the fuel tank 6 is fixed, is provided on the upper surface of each of the front fixation portions 51 (see FIG. 9).

As illustrated in FIG. 13, a groove 50b elongated in the front-rear direction is formed on a surface facing toward the center in the vehicle width direction of the upper frame section 50. That is, the cross-sectional shape of the upper frame section 50 (cross-section shape taken along a plane perpendicular to the extending direction of the upper frame sections 50) is an open cross-section opening toward the center in the vehicle width direction (opening in a direction indicated by an arrow We of FIG. 13). Further, the upper frame sections 50 preferably have a width W7 in the up-and-down direction that is larger than a width W8 in the vehicle width direction.

As described above, the body frame 20 of the saddle-ride type four-wheeled vehicle 1 includes the lower frame 21 extending below the engine 11 from between the right and left front wheels 3 to the rear of the vehicle 1. Further, the body frame 20 includes the front frame section 30. The front frame section 30 is preferably made of aluminum or aluminum alloy, situated between the right and left front wheels 3, and located above the lower frame 21. In the front frame section 30, two pairs of arm-supporting portions 31a, 31b situated away from each other in the front-rear direction and supporting the front rods 8a and the rear rods 8b, and the shock-absorber-supporting portions 32c situated above the two pairs of arm-supporting portions 31a, 31b and supporting the upper ends 2a of the shock absorbers 2, are provided. The front frame section 30 has, at the forefront of the front frame section 30, the lower pillars 32g extending obliquely upward and rearward from the lower ends (lower end of the base portion 32h) connected to the lower frame 21. The front arm-supporting portions 31a of the two pairs of arm-supporting portions 31a, 31b, and the shock-absorber-supporting portions 32c are provided in the lower pillars 32g.

According to the saddle-ride type four-wheeled vehicle 1 described above, the lower pillars 32g extend from the lower ends thereof obliquely upward and rearward, and hence it is possible to form the lower pillars 32g into a straight shape. Therefore, in comparison with a case where the lower pillars 32g are bent at middle portions thereof, it becomes easy to ensure strength of the body frame 20. Further, in the saddle-ride type four-wheeled vehicle 1, the lower pillars 32g are situated at the forefront of the front frame section 30, and the front arm-supporting portions 31a are provided in the lower pillars 32g. Therefore, it becomes easy to support the proximal ends of the front rods 8a at positions separated forward from the shock absorbers 2, and it is possible to secure sufficient clearances between the front rods 8a and the shock absorbers 2.

Further, the front frame section 30 includes the right and left lower pillars 32g, and the lower ends of the right and left lower pillars 32g are integrated with each other and connected to the lower frame 21 (arm-coupling section 22, in this example). With this configuration, strength of the lower pillars 32g can be increased. Further, when the lower ends of the lower pillars 32g are spaced away from each other, it is necessary to have a cross portion bridge between the lower ends of the right and left lower pillars 32g in order to ensure strength of the front frame section 30. In the saddle-ride type four-wheeled vehicle 1, the lower ends of the lower pillars 32g are integrated with each other, and hence there is no need to provide such a cross portion. As a result, it is possible to reduce an amount of material necessary to form the front frame section 30.

Further, the saddle-ride type four-wheeled vehicle 1 includes the right and left lower arms 9 extending from the body frame 20 outward in the vehicle width direction and supporting the front wheels 3. The lower frame 21 has, at the front portion thereof, the arm-coupling section 22 extending in the front-rear direction and supporting the right and left lower arms 9. Further, the lower ends (base portion 32h) of the right and left lower pillars 32g are connected to the arm-coupling section 22. With this configuration, there is no need to provide two arm-coupling sections spaced away from each other in the vehicle width direction. Also, the arm-coupling section 22 can be located at the center in the vehicle width direction. Thus, it is possible to reduce the number of members that are included in the body frame 20. Further, in comparison with a case where two arm-coupling sections spaced away from each other in the vehicle width direction are provided and the right and left lower arms 9 are supported by the two arm-coupling sections, respectively, it is possible to elongate the lower arms 9 toward the center in the vehicle width direction. As a result, while maintaining the movable range in the up-and-down direction of the front wheels 3, it is possible to reduce an operating amount (angle) of the lower arm 9 that is movable up and down around its proximal portion supported by the lower frame 21.

Further, the lower frame 21 includes the right and left engine-supporting sections 23 which are preferably made of a material having an elastic modulus higher than that of the front frame section 30 and are situated under the engine 11. Further, the front frame section 30 includes the right and left rear pillars 33 extending from the upper portions (middle portions 32b, in this example) of the lower pillars 32g rearward and obliquely downward. Further, the lower ends of the rear pillars 33 are connected to the engine-supporting sections 23, respectively. With this configuration, rigidity in the vehicle width direction of the front frame section 30 can be supplemented by the engine-supporting sections 23.

Further, the front frame section 30 includes the cross portion 36 bridging between the right and left rear pillars 33. The cross portion 36 is situated higher than the lower ends of the right and left rear pillars 33. With this configuration, at the manufacturing stage of the body frame 20, the rear pillars 33 can be deformed such that the positions of the lower ends of the rear pillars 33 are shifted slightly in the vehicle width direction. Therefore, even when the positions of the lower ends of the rear pillars 33 are deviated from the positions of the engine-supporting sections 23 due to manufacturing tolerance of the front frame section 30 or the lower frame 21, the lower ends of the rear pillars 33 can be connected to the engine-supporting sections 23 by deforming the rear pillars 33.

Further, the front frame section 30 includes the right and left upper pillars 32d extending from the lower pillars 32g further upward and obliquely rearward. Further, the upper ends of the right and left upper pillars 32d are preferably integrated with each other. With this configuration, it is possible to increase strength of the upper portion of the front frame section 30.

Further, the integrated upper ends of the right and left upper pillars 32d are provided in the steering-supporting portion 32e to support the steering stem 18. With this configuration, it is possible to reduce the number of members constituting the body frame 20, and to support the steering stem 18.

Further, the upper arms 8 includes the pivot portions 8c extending in the front-rear direction, to which the proximal ends of the front rods 8a and the proximal ends of the rear rods 8b are connected. Further, each of the pivot portions 8c is located between the pair of arm-supporting portions 31a, 31b. With this configuration, frame strength in the front-rear direction of the front frame section 30 can be supplemented by the pivot portions 8c. In this example, the front frame section 30 includes the beams 35 extending rearward from the lower pillars 32g along the pivot portions 8c. With this configuration, strength of the beams 35 can be supplemented by the pivot portions 8c.

Further, the front frame section 30 includes the upper pillars 32d extending upward from the lower pillars 32g and formed integrally with the lower pillars 32g. Further, the cross sectional shapes of the lower pillars 32g (cross sectional shapes of the lower pillars 32g taken along planes perpendicular or substantially perpendicular to the extending direction of the lower pillars 32g) are formed to be different from the cross sectional shapes of the upper pillars 32d (cross sectional shapes of the upper pillars 32d taken along planes perpendicular or substantially perpendicular to the extending directions of the upper pillars 32d) so that the lower pillars 32g have higher rigidity than that of the upper pillars 32d. With this configuration, it is possible to prevent frame rigidity from varying drastically at connecting positions between the lower frame 21 and the lower pillars 32g. In this example, each of the lower pillars 32g preferably has a closed cross-section, and each of the upper pillars 32d preferably has an open cross-section, for example.

The lower frame 21 includes the engine-supporting sections 23 which are situated under the engine 11 and support the engine 11 from below. The engine-supporting sections 23 are preferably made of a material having an elastic modulus higher than that of the upper frame 25.

According to the body frame 20 described above, in comparison with a case where the engine-supporting sections 23 are made of the same material as that of the upper frame 25, the engine-supporting sections 23 can be constituted by thinner members. As a result, it is possible to increase a degree of freedom in terms of a layout of other devices located near the engine-supporting sections 23. Further, the upper frame 25 and the engine-supporting sections 23 preferably are made of different materials. With this configuration, for example, by making the upper frame 25 of a lighter material than that of the engine-supporting sections 23, it is possible to reduce the weight of the body frame 20.

Further, the lower frame 21 is preferably a pipe-shaped member. With this configuration, it is possible to reduce the weight of the body frame 20.

The lower frame 21 includes the right and left engine-supporting sections 23 which branch right and left from the arm-coupling section 22 situated at the center in the vehicle width direction and extend rearward. With this configuration, the engine 11 can be supported at two positions separated from each other in the vehicle width direction, and hence it is possible to improve stability for supporting the engine 11.

Further, the arm-coupling section 22 preferably has a rectangular cross-section. With this configuration, in comparison with a case where the arm-coupling section 22 is constituted by a member having an annular cross-section, it is possible to increase rigidity of the arm-coupling section 22.

Further, a portion of the upper frame 25 is a member in which a groove elongated in the extending direction of the portion of the upper frame 25 is formed. That is, the groove 32k elongated in the extending direction of the upper pillar 32d is formed in the upper pillar 32d of the front frame section 30. Also, the groove 50b elongated in the extending direction of the upper frame sections 50 is formed in the upper frame sections 50. With this configuration, in comparison with a case where the whole of the upper frame 25 is constituted by a member having a closed cross-section, it is possible to further reduce the weight of the body frame 20.

Note that the present invention is not limited to the above-mentioned body frame 20, and various modifications are possible. For example, in the above description, the upper frame 25 preferably includes the front frame section 30, the rear frame section 40, the upper frame sections 50, and the seat frame section 29, and those members are all made of the same material, such as aluminum, for example. However, the front frame section 30, the rear frame section 40, the upper frame sections 50, and the seat frame section 29 may be made of different materials.

Further, in the above description, the upper frame sections 50, the front frame section 30, and the rear frame section 40 preferably are separate members, and are coupled to each other by bolts, for example. However, those members may be fixed to each other by welding or the like.

Figure 14:
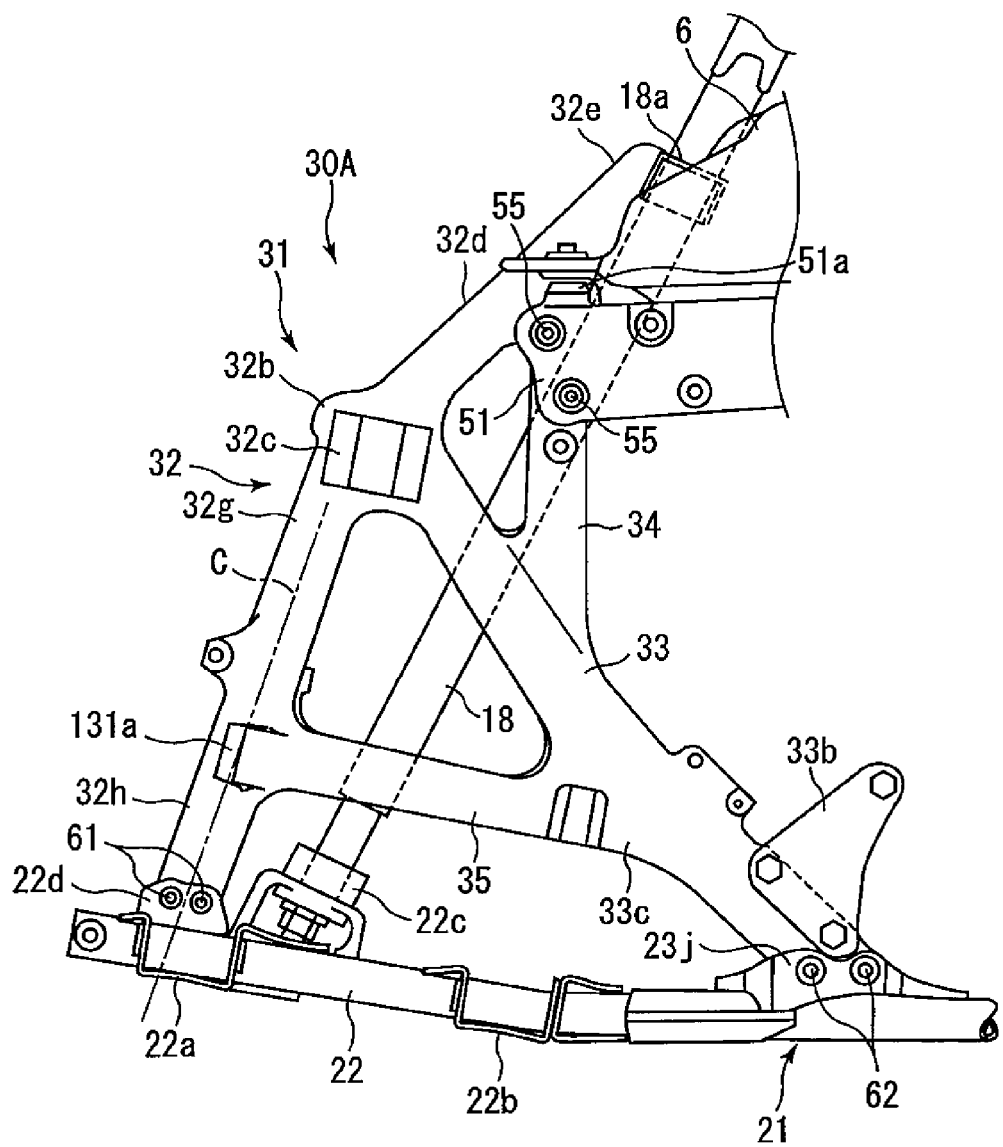
FIG. 14 is a side view of a front frame section according to another preferred embodiment of the present invention.

Further, in the above description, the front arm-supporting portions 31a are arranged further forward than the front surfaces of the lower pillars 32g when viewed from the side of the vehicle 1. However, the front arm-supporting portions 31a may be situated further rearward than the front surfaces of the lower pillars 32g. FIG. 14 is a side view of a front frame section 30A according to another preferred embodiment of the present invention. In FIG. 14, the same components as those described above are denoted by the same reference symbols. In the front frame section 30A illustrated in FIG. 14, a front arm-supporting portion 131a is provided on the side surface of each of the lower pillars 32g. That is, the arm-supporting portion 131a is situated outward from a center line C of each of the lower pillars 32g in the vehicle width direction.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A saddle-ride type four-wheeled vehicle, comprising:
a body frame;
front wheels located on right and left sides of the body frame;
upper arms arranged to extend from the body frame outward in a vehicle width direction and to support the front wheels, each of the upper arms including a front rod and a rear rod arranged to extend outward in the vehicle width direction from positions separated from each other in a front-rear direction; and
shock absorbers including upper ends supported by the body frame, and middle portions located between the front rods and the rear rods; wherein
the body frame includes:

a lower frame extending below an engine from between the right and left front wheels to the rear of the vehicle; and a front frame made of aluminum or aluminum alloy, situated between the right and left front wheels, and located above the lower frame, the front frame including:

pairs of arm-supporting portions spaced away from each other in the front-rear direction and arranged to support the front rods and the rear rods; and shock-absorber-supporting portions located above the respective arm-supporting portions and arranged to support the upper ends of the shock absorbers; wherein the front frame includes, at a forefront of the front frame, an extending portion arranged to extend obliquely upward and rearward from a lower end of the extending portion connected to the lower frame; and front arm-supporting portions of the arm-supporting portions and the shock-absorber-supporting portions provided in the extending portion.

2. The saddle-ride type four-wheeled vehicle according to claim 1, wherein the front frame comprises right and left extending portions defining the extending portion, and lower ends of the right and left extending portions are integral with each other and are connected to the lower frame.

3. The saddle-ride type four-wheeled vehicle according to claim 2, further comprising right and left lower arms extending from the body frame outward in the vehicle width direction and arranged to support the front wheels, wherein the lower frame includes, at a front portion of the lower frame, an arm-coupling section extending in the front-rear direction and arranged to support proximal ends of the right and left lower arms, and the lower ends of the right and left extending portions are connected to the arm-coupling section.

4. The saddle-ride type four-wheeled vehicle according to claim 1, wherein the lower frame comprises right and left engine-supporting sections made of a material having an elastic modulus higher than that of the front frame and located under the engine, and the front frame includes right and left extending portions defining the extending portion and right and left rear extending portions arranged to extend from upper portions of the right and left extending portions rearward and obliquely downward, and lower ends of the right and left rear extending portions are connected to the right and left engine-supporting sections.

5. The saddle-ride type four-wheeled vehicle according to claim 4, wherein the front frame includes a cross portion bridging between the right and left rear extending portions, and the cross portion is higher than the lower ends of the right and left rear extending portions.

6. The saddle-ride type four-wheeled vehicle according to claim 1, wherein the front frame includes right and left extending portions defining the extending portion, and right and left upper extending portions arranged to extend from the right and left extending portions further obliquely upward and rearward, and upper ends of the right and left upper extending portions are integral with each other.

7. The saddle-ride type four-wheeled vehicle according to claim 6, wherein the upper ends of the right and left upper extending portions are provided in a supporting portion arranged to support a steering stem.

8. The saddle-ride type four-wheeled vehicle according to claim 1, wherein each of the upper arms includes a pivot portion extending in the front-rear direction, to which a proximal end of the front rod and a proximal end of the rear rod are connected, and each of the pivot portions is located between the pair of arm-supporting portions.

9. The saddle-ride type four-wheeled vehicle according to claim 8, wherein the front frame includes a beam extending rearward from the extending portion along the pivot portions.

10. The saddle-ride type four-wheeled vehicle according to claim 1, wherein the front frame includes an upper extending portion arranged to extend from the extending portion further upward and is integral with the extending portion, and a cross sectional shape of the extending portion, which is taken along a plane perpendicular or substantially perpendicular to an extending direction of the extending portion, is different from a cross sectional shape of the upper extending portion, which is taken along a plane perpendicular or substantially perpendicular to an extending direction of the upper extending portion so that the extending portion has rigidity higher than that of the upper extending portion.

11. The saddle-ride type four-wheeled vehicle according to claim 10, wherein the extending portion has a closed cross-section, and the upper extending portion has an open cross-section.

* * * * *